UNITED STATES PATENT OFFICE.

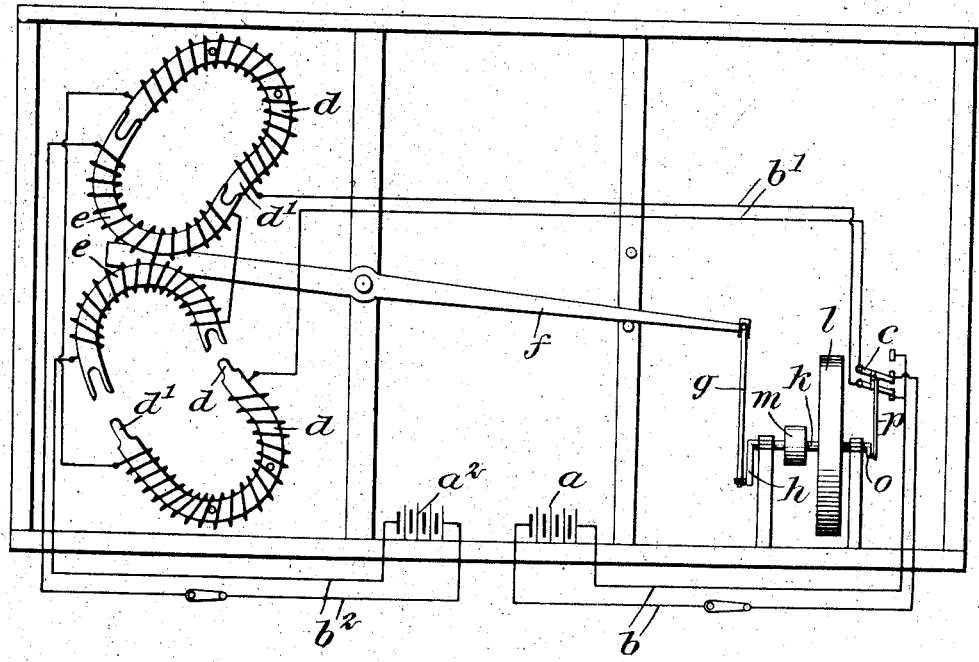

ARTHUR HOPKINS BEARD, OF MEMPHIS, TENNESSEE.

ELECTROMAGNETIC MOTOR.

No. 883,276.

Specification of Letters Patent.

Patented March 31, 1908.

Application filed January 31, 1906. Serial No. 298,778.

*To all whom it may concern:*

Be it known that I, ARTHUR HOPKINS BEARD, a citizen of the United States, and a resident of Memphis, in the county of Shelby and State of Tennessee, have invented a new and Improved Electromagnetic Motors, of which the following is a full, clear, and exact description.

My invention relates to a motor in which the application of magnetic force induced by electricity is applied in a most economical and efficient manner.

The principal objects of the invention are to transform the energy due to electricity and magnetism into other forms of energy, and apply it to useful purposes in a most economical and efficient manner.

Reference is to be had to the accompanying drawing forming a part of this specification, in which the figure is a side elevation of a motor illustrating the principle of my invention.

I provide a motive power by connecting a source of power, as a battery $a$, through an electric circuit $b$ and a pole changer $c$ of ordinary construction, with a conductor $b'$, which is adapted to energize two magnets $d$. It will be observed that if the pole changer is provided with means for operating it the circuit formed by the conductors $b$ and $b'$ will alternately and simultaneously magnetize the magnets $d$ in opposite directions. These magnets are provided with poles $d'$, and vibrating between these poles in the field of force I locate a permanent or electro-magnet $e$. This magnet is preferably double and is mounted upon a lever $f$ which is pivoted on the frame of the machine. This lever is provided at the end of its opposite arm with a link $g$ operating a crank $h$ which turns a shaft $k$. On this shaft is mounted a fly wheel $l$ and, if desired, a pulley $m$. The shaft may also be provided with a crank $o$ and a link $p$ for operating the pole changer, but the pole changer can be operated directly from the shaft by the use of a commutator. The magnet $e$ is energized by a source of power represented by a battery $a^2$ and conductors $b^2$, the direction of the current and of the magnetic flux being constant.

The operation of the device will be readily understood The currents (either chemical or frictional) being turned on, the current around the magnets $d$ will be reversed and returned to the original direction once during each revolution of the shaft $k$, and, as the magnetic flux of the magnets $e$ is in a constant direction, they are each alternately attracted and repelled by either of the poles of the electro-magnets $d$, the actions on the two magnets $e$ being simultaneous but opposite. The lever $f$ vibrates and this motion then keeps the shaft $k$ in operation, the fly wheel operating in the ordinary manner to overcome dead centers and equalize the force. Power may be taken from the shaft by connecting the pulley $m$ with other machinery or in any ordinary manner.

The two electro-magnets $d$ $d$ are of the horse shoe type and the two poles of the upper and lower magnets $d$ are on a radial line from the center of oscillation of the lever $f$, and in like manner the poles of the magnets $e$ $e$ are on a radial line from such center. It therefore results that the general position of all the magnets conforms to a circular curve, giving the magnets an oblique arrangement. The poles of the stationary and movable magnets are also of interlocking or telescopic adaptation to each other, *i. e.*, the stationary magnets $d$ have reduced pole ends $d'$ that enter corresponding slots or sockets in the pole ends of the movable magnets. This, while not a new feature generally considered, has nevertheless a special correlation and coordinated value when a pivoted lever $f$ carrying the movable magnets oscillates between two stationary magnets reversely charged, which I will now proceed to explain.

In the position shown in the drawing there are two forces tending to bring down the left hand end of lever $f$. One force is the repellent action which the upper stationary magnet $d$ exerts upon the upper movable magnet $e$ and the other force is the attractive force which the (oppositely charged) lower stationary magnet $d$ exerts upon the lower movable magnet $e$. The order in which these forces act, is as follows. The downward movement gets its initial power from the repellent action of the upper magnets, and as the poles recede from each other this repellent power wanes, while as the poles of the magnets below approach the attractive power increases until the poles meet. Then when the pole changer $c$ reverses the charge of the magnets $d$ $d$, the lower magnets become repelling factors and the upper magnets attracting factors. The telescoping or interlocking action of one set of poles into the other has an important value in this connection, aside from its magnetic value, in that when such magnets, acting by both repulsion and attraction, are mounted on a pivoted lever, as in my invention, the initial repellent force is very great and but for the reciprocal fit and guiding effect of the interlocked poles in receding, the movable magnets in this thrust or repellent movement would have a tendency to twist sidewise on the lever and lose their coaxial position. This is a result of great importance in the repellant movement, since the power is a thrust which would cause the magnets to separate with a sidewise twist and leave the coaxial relation, while in the attraction movement the tendency is to seek the coaxial relation by mutual affinity.

Having thus described my invention, I claim:

1. An electro-magnetic motor, comprising a pivoted lever bearing on one end two electro-magnets with oppositely projecting poles arranged on lines radial to the center of the lever and continuously wound helices, a single electric circuit normally closed through both said helices, two stationary electro-magnets arranged on opposite sides of the movable magnets with poles facing those of the intermediate movable magnets and arranged on the radial lines of the lever's center, an electric circuit passing through the coils of both stationary magnets, a pole changer for alternately reversing this circuit, and mechanical means for shifting the pole changer by the oscillation of the lever.

2. An electro-magnetic motor, comprising a pivoted lever bearing on one end two magnets with oppositely projecting poles arranged on lines radial to the center of the lever, two stationary electro-magnets arranged on opposite sides of the movable magnets with poles facing those of the intermediate movable magnets and arranged on the radial lines of the lever's center, an electric circuit passing through the coils of both stationary magnets, a pole changer for alternately reversing this circuit and mechanical means for shifting the pole changer by the oscillations of the lever.

3. An electro-magnetic motor, comprising a pivoted lever bearing at one end two magnets with oppositely projecting poles arranged on lines radial to the center of the lever, two stationary electro-magnets arranged on opposite sides of the movable magnets with poles facing those of the intermediate movable magnets and arranged on the radial lines of the lever's center, the oppositely facing poles of the movable and stationary magnets being formed with coaxially interlocking pole ends, an electric circuit passing through the coils of both stationary magnets, a pole changer for alternately reversing this circuit and mechanical means for shifting the pole changer by the oscillations of the lever.

4. In a motor, the combination of four electro-magnets, two batteries, a pole changer, conductors connecting one battery with the pole changer, and the latter with its field magnets, a crank shaft, a link connecting the crank shaft with the pole changer, a pivoted lever, a link connecting one end of the lever with the crank shaft, movable electro-magnets mounted on the other end of the lever between the field magnets and energized by the second battery, and conductors connecting this battery with the movable electro-magnets.

5. In a motor, the combination of semicircular field magnets, a circuit for supplying a current thereto, a pole changer in said circuits, a double semi-circular plunger magnet between the field magnets and acting as armatures thereto, and recessed to receive the poles thereof, a pivoted lever upon one end of which the double magnet is mounted, a shaft, means for connecting the other end of the lever with said shaft to operate it, and means for operating the pole changer from the shaft.

In testimony whereof I have signed my name to this specification in the presence of two subscribing witnesses.

ARTHUR HOPKINS BEARD.

Witnesses:
J. M. SCRUGGS,
LEM BANKS.